Nov. 30, 1954                B. FATA                    2,695,639
             MACHINE FOR MAKING TAPERED DOVETAIL JOINTS
Filed April 27, 1953                              5 Sheets-Sheet 3

INVENTOR.
BERNARD FATA
BY Cornelius Zalusrki
ATTORNEY

Nov. 30, 1954  B. FATA  2,695,639
MACHINE FOR MAKING TAPERED DOVETAIL JOINTS
Filed April 27, 1953  5 Sheets-Sheet 5
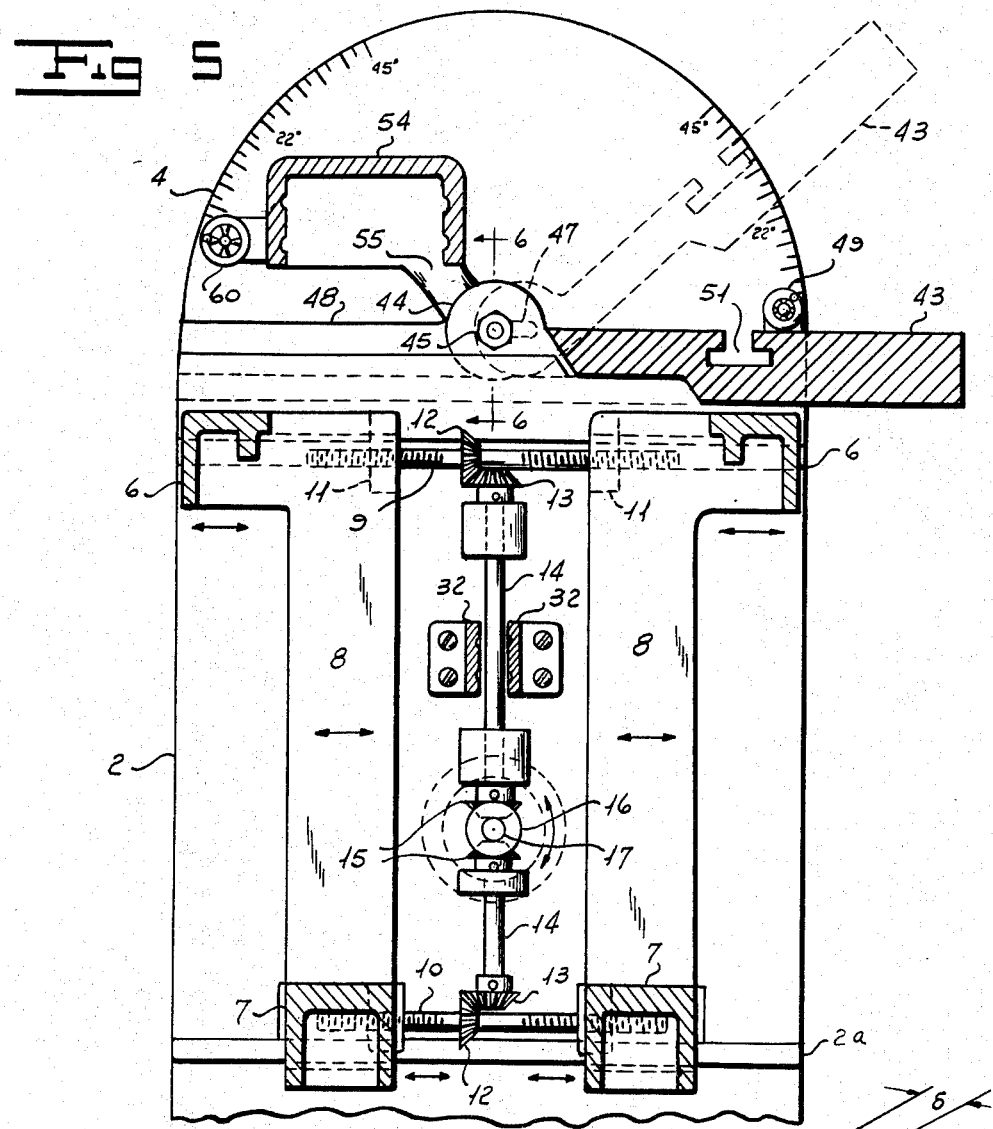
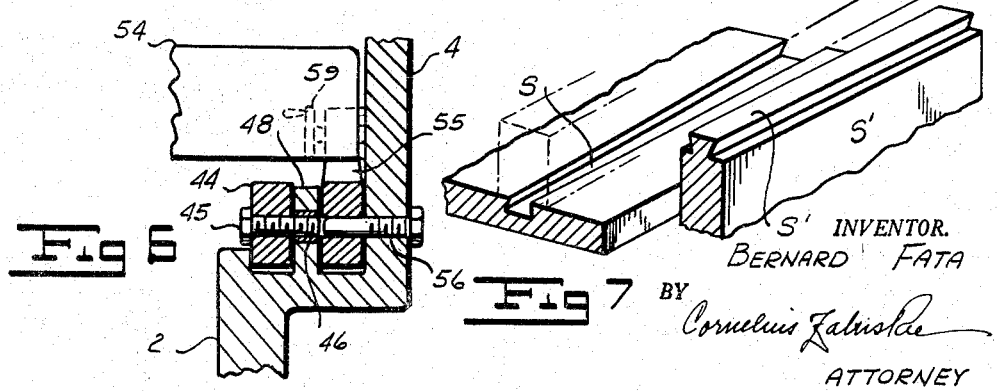
INVENTOR.
BERNARD FATA
BY Cornelius Zabriskie
ATTORNEY

United States Patent Office 2,695,639
Patented Nov. 30, 1954

2,695,639

MACHINE FOR MAKING TAPERED DOVE-TAIL JOINTS

Bernard Fata, Bronx, N. Y.

Application April 27, 1953, Serial No. 351,428

11 Claims. (Cl. 144—136)

This invention is a machine for making dove-tail joints and, more particularly, one wherein such joints may be made either straight or tapered as may be desired.

The object of this invention is to produce a machine of the character described capable of making dove-tail joints of great accuracy and fine fit, in a novel and efficient manner. The machine of this invention fulfills this object.

The accompanying drawings illustrate one practical embodiment of the invention, but the construction therein shown is to be understood as illustrative, only, and not as defining the limits of the invention.

Fig. 5 is a section on the line 5—5 of Fig. 2.

Fig. 6 is a fragmental section on the line 6—6 of Fig. 5.

Fig. 7 is a perspective view showing one type of dove-tail joint which may be made by this machine.

Figure 1:
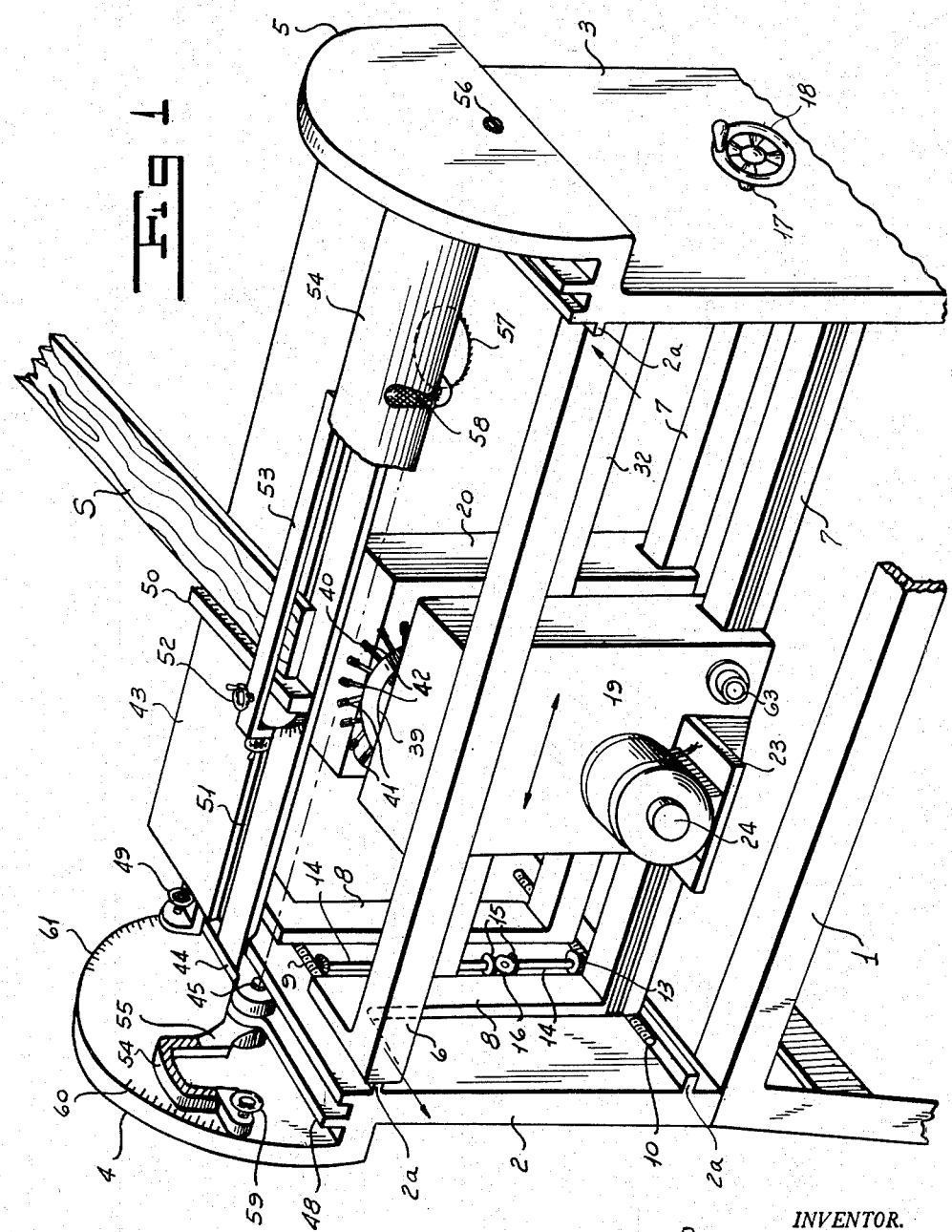
Fig. 1 is a perspective view of a machine embodying the present invention.

Referring to the drawings, 1 designates the base at the opposite ends of which are mounted two upstanding end frames 2 and 3, which carry integral upstanding end plates 4 and 5.

Figure 2:
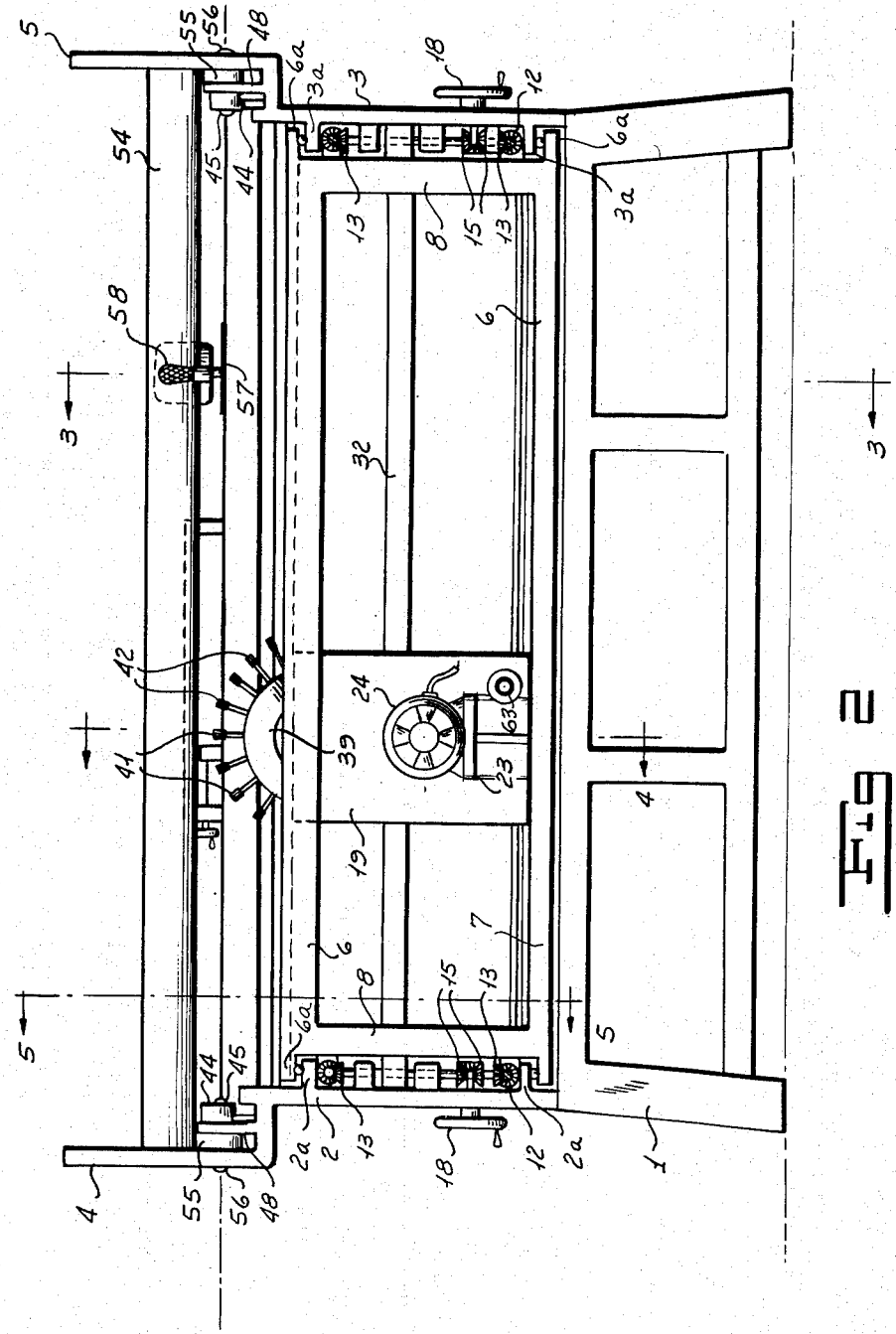
Fig. 2 is a side elevation of the machine shown in Fig. 1.
Figure 3:
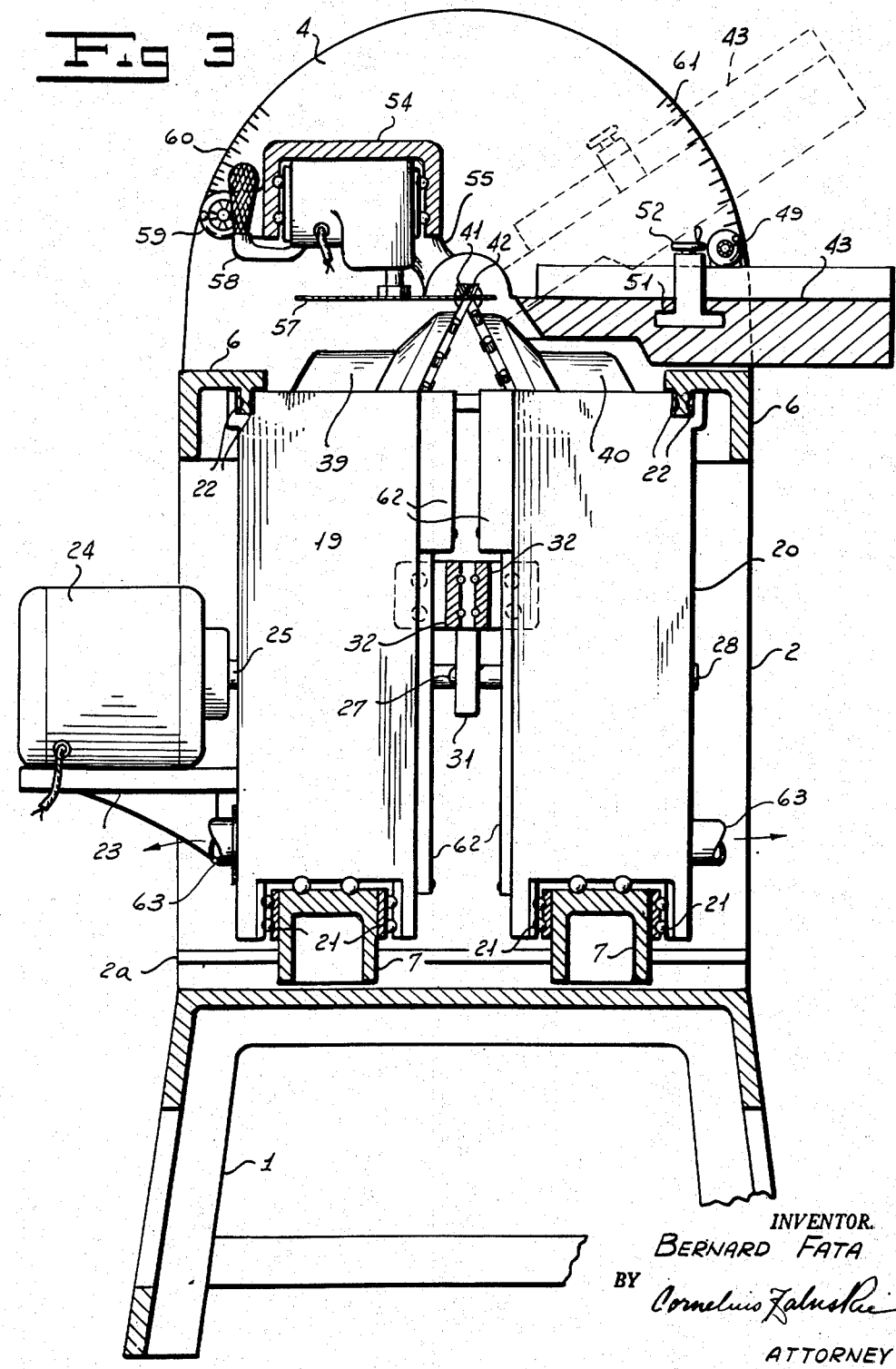
Fig. 3 is a transverse section on the line 3—3 of Fig. 2.

Extending between the end frames 2 and 3 are upper and lower guides 6 and 7, respectively, which guides may be connected by spacers 8, as shown best in Figs. 1 and 5. The opposite ends of each upper guide 6 are provided with lugs 6a resting upon flanges 2a and 3a, respectively, on the end frames with interposed anti-friction bearings. Each pair of upper and lower guides are adapted for the same adjustment. This adjustment is accomplished by means of upper and lower horizontal adjusting screws 9 and 10, respectively. Each adjusting screw is provided at its opposite ends with right and left hand threads. These threaded ends of the upper screw thread through lugs 11 in the upper ends of the spacers 8, while the opposite ends of the lower screw 10 thread into the lower guides 7, as shown best in Fig. 5. Each of the screws 9 and 10 carries a bevel gear 12 meshing with a bevel gear 13. These two bevel gears 13 are mounted on shafts 14, the contiguous ends of which carry bevel gears 15 which mesh with a common bevel gear 16 fixed on the inner end of a stub shaft 17. Each stub shaft 17 projects through the corresponding end frame 2 or 3 and is provided at its outer end with a hand wheel 18 (see Figs. 1 and 2).

Through the individual manipulation of the hand wheels 18, the upper and lower guides on each side of the machine may be moved from parallel relation to the corresponding guides at the other side of the machine or they may be moved into divergent relation, depending upon whether or not straight or tapered dove-tail joints are to be produced. Parallelism between each upper guide and its corresponding lower guide is assured at all times by the spacers 8.

Mounted to travel longitudinally of the machine between the upper and lower guides at the two sides of the machine are a pair of twin box-like carriers 19 and 20. Each carrier straddles its corresponding lower guide 7 (Fig. 4), with anti-friction bearings 21 between them, while the upper end of such carrier straddles a depending flange on the upper guides 6, with similar anti-friction bearings 22.

The carrier 19 has an external bracket 23 on which is mounted a motor 24. This motor drives a shaft 25 journalled in a bearing 26 and the inner end of this shaft, which terminates at substantially the longitudinal medial line of the machine, has a universal joint connection 27 with a shaft 28 journalled in a bearing 29. The bearings 26 and 29 are, respectively, carried by the contiguous walls of the box-like carriers 19 and 20 and support the shafts 25 and 28 for rotation on a common axis when the upper guides 6, 6 and the lower guides 7, 7 are respectively parallel to one another. The universal joint 27, however, permits the shaft 28 to be driven from the shaft 25 when said guides are moved into divergent relation.

It is important, however, that the shafts 25 and 28 be secured against axial movement and that the universal joint 27 be maintained at all times centrally of the machine. This is accomplished by providing the contiguous ends of each of the shafts 25 and 28 with radially extending pins 27' which extend loosely into an annular groove 30 in the retainer 31. The upper end of this retainer 31 is housed between bars 32 which extend longitudinally of the machine and are supported at their opposite ends by the end frames 2 and 3 (see Figs. 2 and 4). The retainer is thus mounted for sliding travel longitudinally of the bars 32 and anti-friction bearings, e. g., ball bearings, may be provided as shown to minimize friction during such sliding movement. The retainer 31 is permitted to axially oscillate as the guides 6 and 7 are adjusted, but it holds the shafts 25 and 28 against axial movement at all times.

The shafts 25 and 28 are provided with key slots and their bearings through the inner walls of the carriers are provided with sleeves keyed to said slots so that the shafts may slide through the sleeves of the bearings. Furthermore, that portion of the shaft 25 which extends into the armature shaft of the motor also has a sliding keyed connection with the latter and thus the carriers are free to move toward and away from one another as they move along the upper and lower guides 6 and 7, while still maintaining proper driving connection between the motor and both shafts.

On the inner end portions of the shafts 25 and 28 are mounted gears 33 and 34. The shafts also are slidable with respect to these gears but are keyed for rotation therewith. These gears 33 and 34 mesh with pinions 35 and 36, carried by shafts 37 and 38 supported in bearings on the respective carriers. In order that the gears 33, 34, 35 and 36 and the associated bearings may be properly lubricated, the contiguous sides of the carriers 19 and 20 are closed by plates 62, so that the enclosed chambers thus formed may be filled with a lubricant.

Figure 4:
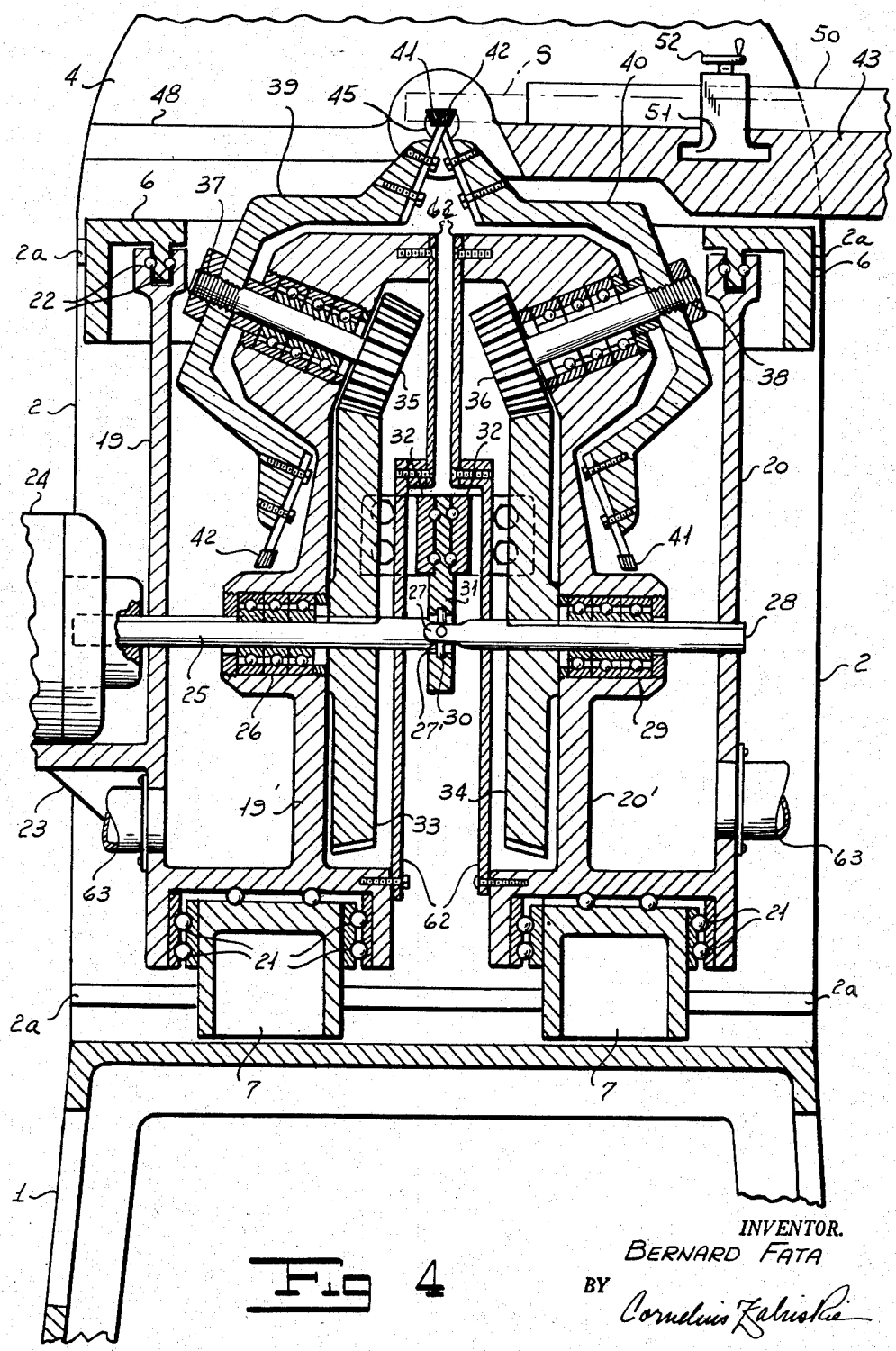
Fig. 4 is a like section on the line 4—4 of Fig. 2.

To the outer ends of the shafts 37 and 38 are rigidly secured cutter holders 39 and 40 to which are fixed a succession of arcuately spaced apart radial cutters or chisels 41 and 42, respectively. The cutters 41 are staggered with respect to the cutters 42, so that when these cutters are in overlapped relation, as shown in Fig. 4, they will extend between one another. These cutters are driven from the motor through shafts 25 and 28, gears 33 and 34, and pinions 35 and 36 to rotate at the same speed. They may be moved from the lapping relation shown in Fig. 4, wherein they are positioned to cut a dove-tail slot, to a position wherein they do not overlap but are spaced apart in a lateral direction to cut the dove-tail, as will be presently explained.

The relation between the cutters is controlled by the position of the carriers 19 and 20 longitudinally of the guides 6 and 7 and, when these guides are all parallel to one another, straight slots and dove-tail tenons will be cut, whereas divergence of these guides will bring about the formation of correspondingly tapered slots and dove-tail tenons.

The work stock S to be operated upon, is adapted to be supported on a work table 43. This table is provided on each end with a bracket 44, each of which carries a pivot pin 45 extending through the bracket and into a sleeve 46, as shown in Fig. 6. This sleeve is received in a horizontal slot 47 in a table carrying rib 48 formed on the frame (Figs. 1 and 5), so that the table may be pivotally moved from the horizontal position shown in Figs. 1 and 5 through the inclined position, as shown in dotted lines in Fig. 5, to a substantially vertical or upstanding position (not shown). The table may be locked in any of these positions by a locking screw 49, one of which is associated with each end of the table and which locking screws bear against the end plates 4.

A cross cut guide 50 is operable in an undercut slot 51 and is slidable therein longitudinally of the table, but may be locked in any desired position by means of a locking screw 52. This cross cut guide carries a hold-down bar 53 which serves to hold down the piece S when the latter is flat on the table beneath that bar. The cross cut guide 50 may be adjusted into different angular positions, depending upon the angle at which the joint elements are to be formed in the piece S.

Extending across the upper portion of the machine between the end frames is an inverted U-shaped supporting guide 54. This guide is provided at each of its ends with a bracket 55 perforated to receive a pivot pin 56 carried by one of the end plates, as shown in Fig. 6. Within the guide 54, a motor driven circular saw is adapted to travel longitudinally of the machine. This saw may be in the nature of a "Skil-Saw," the blade of which is indicated generally by the reference character 57 in Fig. 1.

A handle 58 on the saw may be grasped to move this saw back and forth across the top of the machine and the saw may be tilted with its guide from horizontal to any desired inclination and locked in adjusted position by locking screws 59, one of which is provided at each end of the guide. The end plates are preferably provided with graduations 60 and 61 to facilitate the angular setting of both the circular saw and the table.

If it be assumed that the work to be done is to produce products such as shown in Fig. 7, the work piece S is laid upon the table, while the latter is horizontal, and this piece is preferably clamped to the table by an appropriate C-clamp or otherwise in such position that, when operated on by the cutters, a mortise will be cut in the under side thereof. The center line of the cutters should correspond to the center line of the mortise to be cut. The upper and lower guides 6 and 7 having been adjusted by the hand wheels 18 to, e. g., the desired taper of the mortise, the piece S remains stationary and in clamped position on the table, while the carriers 19 and 20 are positioned in removed relation from the piece S. These carriers are then moved longitudinally of the machine the work piece and, as the cutters pass beneath it, they cut a tapered dove-tail mortise in the under side of said piece, it being understood of course that said cutters are in the overlapped relation shown in Fig. 4.

Movement may be imparted to the carriers either by pushing one of them manually or by means of a handle projecting forward of the machine from one of them or by a worm drive or in any other suitable manner. It is only necessary, however, to apply force to one of them because the shafts 25 and 28 will impart movement to the other carrier when one of them is moved.

Having formed the dove-tail mortise s in the piece S, said piece is removed from the table and the table is then tilted so that its work supporting face is vertical. This is accomplished by loosening the locking screws 49 at the ends of the table. The table is then shifted backwardly away from the cutters, so that the vertical plane of said surface of the table is medially of the cutters. This adjustment is permitted by the slots 47 which allow of this movement of the table. When properly positioned, the locking screws are tightened.

The guides 6 and 7 are then moved apart by operation of the hand wheels 18 until the two sets of cutters are spaced apart a distance appropriate to the cutting of a dove-tail tenon in the end of the work piece S' which is then clamped against the surface of the table at an elevation to cut the tenon of a depth corresponding to the depth of the mortise s. This tenon may be then cut by moving the carriers longitudinally of their guides to pass the cutters through the end of the piece S' to form the tenon s'.

It will be noted that the carriers 19 and 20 are provided with outlet ducts 63. In practice, these are connected to suitable suction apparatus for drawing off sawdust which would otherwise accumulate within the carriers.

The machine of this invention is highly efficient in the carrying out of its intended functions and by simple adjustments may be made to cut with great accuracy dove-tail mortises and tenons of either tapered or untapered form in a thoroughly satisfactory manner, so that fine cabinet joints may be made with the angle of the taper as desired or as dictated by the particular work ot be performed.

The foregoing detailed description sets forth the preferred practical form of the invention, but the invention is to be understood as fully commensurate with the appended claims.

Having thus fully described the invention, what I claim as new and desire to secure by Letters Patent is:

1. A machine for making dove-tail joints comprising: a frame provided thereon with a work table tiltable from horizontal to vertical position, means for locking the table in the desired position, guides extending longitudinally of the frame, means for adjusting the guides from parallel to the divergent positions desired, twin cutter heads mounted for simultaneous movement longitudinally of the guides through a work piece supported in stationary position on the work table, and means for simultaneously driving both twin cutter heads at the same speed.

2. A machine according to claim 1, wherein the twin cutter heads are respectively supported in twin carriers mounted for movement longitudinally of the guides.

3. A machine according to claim 1, wherein the twin cutter heads are respectively mounted in carriers supported for movement longitudinally in guides engaging both the upper and lower portions of the carriers with the upper and lower guides of each carrier connected for simultaneous adjustment.

4. A machine according to claim 1, wherein the twin cutter heads have cutting blades which are staggered and interfit with one another during the cutting of a dove-tail mortise.

5. A machine according to claim 1, wherein a saw guide extends longitudinally across the top of the machine, and a motor driven saw mounted on said saw guide for sliding movement longitudinally thereof and having a saw blade, said guide being mounted for tilting movement on the frame of the machine to position the saw blade to act upon the work piece while the latter is supported in stationary position on the work table, whereby the operations of said blade upon the work piece may be co-related to the operations of the cutters on said piece.

6. A machine for making dove-tail joints comprising: end frames mounted in spaced apart rigid relation, a tiltable work table supported at its opposite ends on said end frames, guides extending longitudinally of the machine, right and left hand screws threaded with respect to the guides for adjusting them toward and away from one another, means for rotating the said screws to adjust the guides, and for varying their divergence, twin carriers supported on said guides for movement longitudinally thereof, a cutter head mounted on each carrier, cutting blades carried by each head, and means for rotating the cutter heads while the twin carriers are conjointly moved longitudinally of their guides to pass the cutter blades through a work piece supported in stationary position on the work table.

7. A machine according to claim 6, wherein the work table is longitudinally slotted to support a cross-cut guide operable in said slot, with means for locking the cross-cut guide in any position longitudinally of the slot.

8. A machine according to claim 6, wherein each of the cutter heads is mounted to rotate on a stub shaft supported in the corresponding carrier, with gearing connections between each stub shaft, and a drive shaft having a bearing in the corresponding carrier, the contiguous ends of the drive shafts of the twin carriers being connected to one another by a universal joint.

9. A machine according to claim 6, wherein each cutter head is carried on a stub shaft having a gear meshing with a drive gear mounted on a drive shaft which is axially movable through such drive gear, the contiguous ends of both drive shafts being connected by a universal joint, and means for holding said drive shafts against axial movement.

10. A machine for making dove-tail joints comprising: end frames spaced apart in rigid relation to one another, a work table supported on said end frames, guides at the front and the back of the machine, means for relatively adjusting said guides to the desired angle of divergence, twin carriers supported for movement longitudinally of the respective guides, a drive shaft supported by each carrier with one end of each drive shaft secured to aone end of the other drive shaft by universal joint, means slidable within a centering guide extending longitudinally of the machine between the end frames to secure the drive shafts against axial movement, drive gears keyed to the drive shafts and meshing with gears fixed to stub shafts one of which is mounted on each carrier, a cutter head fixed to each stub shaft and rotatable thereby, and cutter blades carried by each of the cutter heads and extending into a position to pass through a work piece mounted in stationary position on the work table when the carriers are moved longitudinally of their guides.

11. A machine according to claim 10, wherein the carriers are sealed to contain a lubricant for the bearing gears of the several shafts.

References Cited in the file of this patent

UNITED STATES PATENTS

| Number | Name | Date |
|---|---|---|
| 97,553 | Robbins et al. | Dec. 7, 1869 |
| 181,897 | Bahse et al. | Sept. 5, 1876 |
| 580,133 | Hunter | Apr. 6, 1897 |
| 779,183 | Renz | Jan. 3, 1905 |